(12) United States Patent
Nagar et al.

(10) Patent No.: US 11,420,891 B2
(45) Date of Patent: Aug. 23, 2022

(54) SYSTEMS, METHODS, AND TECHNIQUES FOR WASTE PROCESSING

(71) Applicant: Duke University, Durham, NC (US)

(72) Inventors: Yaacov Nagar, Durham, NC (US);
Kathleen Jooss, Durham, NC (US);
Marc Deshusses, Durham, NC (US);
Kurabachew Duba, Durham, NC (US)

(73) Assignee: Duke University, Durham, NC (US)

( * ) Notice: Subject to any disclaimer, the term of this patent is extended or adjusted under 35 U.S.C. 154(b) by 228 days.

(21) Appl. No.: 16/757,237

(22) PCT Filed: Oct. 19, 2018

(86) PCT No.: PCT/US2018/056660
§ 371 (c)(1),
(2) Date: Apr. 17, 2020

(87) PCT Pub. No.: WO2019/079687
PCT Pub. Date: Apr. 25, 2019

(65) Prior Publication Data
US 2020/0277213 A1 Sep. 3, 2020

Related U.S. Application Data

(60) Provisional application No. 62/574,787, filed on Oct. 20, 2017.

(51) Int. Cl.
*C02F 11/08* (2006.01)

(52) U.S. Cl.
CPC ........ *C02F 11/086* (2013.01); *C02F 2209/02* (2013.01); *C02F 2209/03* (2013.01); *C02F 2209/10* (2013.01)

(58) Field of Classification Search
None
See application file for complete search history.

(56) References Cited

U.S. PATENT DOCUMENTS

| 5,770,174 A | 6/1998 | Eller et al. |
| 6,171,509 B1 | 1/2001 | McBrayer, Jr. et al. |

(Continued)

FOREIGN PATENT DOCUMENTS

| CN | 102256669 A | 11/2011 |
| CN | 102642947 A | 8/2012 |

(Continued)

OTHER PUBLICATIONS

Indian Patent Office Examination Report for Application No. 202037018797 dated Oct. 22, 2021 (17 pages).

(Continued)

*Primary Examiner* — Richard C Gurtowski
(74) *Attorney, Agent, or Firm* — Michael Best & Friedrich LLP (57) ABSTRACT

A waste processing system includes a reactor including an inlet end and an outlet end configured to discharge reactor effluent. The inlet end includes a mixing unit having an oxidizing material input and a waste stream input. The reactor oxidizing material input is configured to receive reactor oxidizing material at a temperature greater than 200° C. and at a pressure greater than 60 atm. A second waste stream input is positioned between the reactor inlet end and the reactor outlet end.

19 Claims, 7 Drawing Sheets

(56) References Cited

U.S. PATENT DOCUMENTS

| | | | |
|---|---|---|---|
| 7,959,814 B2* | 6/2011 | Masters | F24D 17/00 |
| | | | 166/57 |
| 9,328,008 B2 | 5/2016 | Wang et al. | |
| 2008/0073292 A1* | 3/2008 | Stenmark | C02F 11/086 |
| | | | 210/758 |
| 2009/0266772 A1 | 10/2009 | Martinez de la Ossa Fernandez et al. | |

FOREIGN PATENT DOCUMENTS

| | | |
|---|---|---|
| CN | 103601282 A | 2/2014 |
| CN | 106573227 A | 4/2017 |
| WO | 1995/026929 A1 | 10/1995 |

OTHER PUBLICATIONS

Chinese Patent Office Action for Application No. 201880068217.2 dated Aug. 2, 2021 (12 pages).
Chinese Patent Office Action for Application No. 201880068217.2 dated Mar. 2, 2021 (19 pages, English translation included).
International Search Report and Written Opinion for Application No. PCT/US2018/056660 dated Dec. 20, 2018 (15 pages).

* cited by examiner

SYSTEMS, METHODS, AND TECHNIQUES FOR WASTE PROCESSING

CROSS-REFERENCE

The present patent application is the U.S. national stage entry, under 35 U.S.C. § 371, of International Application Number PCT/US2018/056660, filed Oct. 19, 2018, which claims priority to U.S. provisional patent application No. 62/574,787, filed on Oct. 20, 2017, the entire contents of each of which is hereby incorporated by reference.

TECHNICAL FIELD

The present disclosure relates to systems and methods for processing waste streams. More particularly, reactor systems and methods disclosed and contemplated herein involve processing organic matter that is dissolved or suspended in an aqueous phase.

INTRODUCTION

Waste processing remains a critical priority in today's society. The instant disclosure addresses waste processing where the waste includes organic components. Organic components, and possibly other components, can be oxidized during implementation of various aspects of the systems and methods contemplated herein. In certain applications, systems and methods disclosed herein are performed at pressures and temperatures above the critical point of water (374° C. and 218 atm).

Supercritical water oxidation (SCWO) refers to the oxidation of organic matter in an aqueous phase at pressures and temperatures above the critical point of water (374° C. and 218 atm). Organic matter may be dissolved or suspended in the aqueous phase. Under these conditions, organic matter is typically oxidized at high reaction rates, resulting in complete conversion of the organic matter to $CO_2$ and usable water at reaction times as short as a few seconds. Accordingly, SCWO systems can be more compact compared to other organic matter processing technologies.

SCWO has been successfully applied to the destruction of problematic contaminants such as chemical weapons, PCBs, chlorinated solvents, coking wastewater, landfill leachate, oily wastes, and dye-house wastewater. Unlike hydrothermal treatment which generally produces an effluent liquid requiring additional processing prior to disposal, SCWO treatment yields relatively clean water that can be reused. Additionally, formation of NOx, SOx, and other usual by-products of combustion is minimized because of the relatively low process temperatures and water medium that the reaction takes place in. For these reasons, SCWO has been touted as a promising, environmentally friendly alternative to incineration.

SUMMARY

Systems, methods, and techniques disclosed and contemplated herein involve processing waste and/or wastewater in a reactor system. A reactor in the system includes a waste stream input at or near the reactor inlet end and a reactor oxidizing material input. The reactor also includes at least one additional waste stream input positioned between the reactor inlet end and the reactor outlet end.

In one aspect, a waste processing system is disclosed. The waste processing system may include a reactor comprising an inlet end and an outlet end configured to discharge reactor effluent. The inlet end may include a mixing unit having a reactor oxidizing material input and a first waste stream input. The reactor oxidizing material input may be configured to receive reactor oxidizing material at a temperature no less than 200° C. and at a pressure no less than 60 atm. A second waste stream input is positioned between the reactor inlet end and the reactor outlet end.

In another aspect, a method for operating a waste processing system is disclosed. The method includes providing a waste stream and oxidizing material to a mixing unit of a reactor such that a mixture of the waste stream and the oxidizing material downstream of the mixing unit is at a temperature no less than 200° C. The method may also include providing the waste stream to an additional waste stream input of the reactor, where the additional waste stream input is positioned downstream of the mixing unit.

In another aspect, a waste processing system may include a reactor and a heat exchanger in fluid communication with the reactor. The reactor has a reactor inlet end and a reactor outlet end configured to discharge reactor effluent. The reactor inlet end may include a mixing unit having a reactor oxidizing material input and a first waste stream input, where the reactor oxidizing material input is configured to receive reactor oxidizing material at a temperature no less than 200° C. and at a pressure no less than 60 atm. The reactor also includes one or more additional waste stream inputs positioned between the reactor inlet end and the reactor outlet end. The heat exchanger may include a heat exchanger hot input configured to receive the reactor effluent at a first effluent temperature; a heat exchanger cold input configured to receive a lower temperature reactor oxidizing material; a heat exchanger cold output configured to provide a higher temperature reactor oxidizing material to the reactor oxidizing material input; and a heat exchanger hot output configured to discharge effluent at a second effluent temperature, the second effluent temperature being less than the first effluent temperature.

There is no specific requirement that a material, technique or method relating to waste processing include all of the details characterized herein, in order to obtain some benefit according to the present disclosure. Thus, the specific examples characterized herein are meant to be exemplary applications of the techniques described, and alternatives are possible.

DETAILED DESCRIPTION

Systems and methods disclosed and contemplated herein process waste streams in reactors. Generally, waste streams include slurries (e.g., fecal sludge) and homogenous waste (e.g., chemical waste). Solids in the waste streams may be suspended or dissolved. Oxidizing material, which can include water and/or oxidant, is mixed with the waste stream at an inlet end of the reactor. The waste stream is also introduced at one or more additional locations along the reactor. Such configurations can reduce or eliminate corrosion, charring, and fouling of heat exchanger and/or reactor surfaces and improve the energy efficiency of the process. In some implementations, waste stream and oxidizing material inputs to the reactor can be configured such that the oxidizing material input does not need to include overheated water with the oxidant. That is, heat from the oxidant can be sufficient to bring the waste stream up to a desired temperature, such as a supercritical temperature.

In some implementations, compared to a reactor having only a single waste stream input, the configuration of reactor systems disclosed and contemplated herein can have one or more of various possible improvements.

For instance, less oxidizing material can be required in a reactor system because after the oxidizing material brings the waste stream to a given reaction temperature and pressure, the exothermic reaction from the inlet injection can provide ample energy to bring waste stream from a subsequent, downstream input to a given reaction temperature and pressure. Likewise, that exothermic reaction can ensure that a waste stream from yet another downstream input has sufficient energy to continue the reaction(s).

As another possible improvement, by utilizing exothermic reactions as they occur within a reactor, a reactor system can avoid some of the heat loss inherent in a heat exchanger downstream of the reactor, which can enable a size reduction of that heat exchanger. As another possible improvement, the multiple waste stream inputs can reduce or avoid temperature spikes in a reactor that can be problematic in a single waste stream input configuration, particularly those operating under supercritical conditions.

As another possible improvement, reactor systems and methods disclosed and contemplated herein can have a broader scope of application. For instance, multiple waste stream input configurations described herein have lower calorific content requirements of the waste being treated as compared to single input configurations. As an example, in a prophetic implementation where 1 $m^3$/day of fecal or sewage sludge is processed in a single waste input configuration, a minimum dry solids content of 16%-20% is required for autothermal operation—with no thermal energy to spare. In a prophetic implementation, to contrast, a multiple waste input configuration processes 1 $m^3$/day of fecal or sewage sludge with a minimum dry solids content of 12-16% with an excess of about 9.5 kW thermal energy.

I. Definitions

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of and consisting essentially of," the embodiments or elements presented herein, whether explicitly set forth or not.

As used herein, the term "atmospheric pressure" refers to the pressure of the external environment at the location at which the system and/or the process of the present disclosure is operated.

Definitions of specific functional groups and chemical terms are described in more detail below. For purposes of this disclosure, the chemical elements are identified in accordance with the Periodic Table of the Elements, CAS version, Handbook of Chemistry and Physics, $75^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

II. Example Waste Processing System Parameters

A. Reactor Temperature and Pressure

In operation, reactors contemplated herein operate at temperatures and pressures sufficient to oxidize organic constituents in waste streams provided to the reactor. In some implementations, conditions within a reactor are supercritical, meaning the temperature and pressure are such that water would be in a supercritical phase. In some implementations, conditions within a reactor are supercritical and subcritical. For instance, near a reactor inlet the conditions are subcritical but one or more locations downstream have supercritical conditions. In some implementations, conditions within a reactor are entirely subcritical.

Because organic oxidation reactions are exothermic, typically temperatures within a reactor increase downstream of a waste stream input location. As flow within a reactor encounters another waste stream input, temperature of the flow at that location can decrease but then increase again as the flow and exothermic reaction proceed. The following operating temperatures and pressures are maximums within a reactor.

As an example, an operating temperature of a reactor may be greater than 200° C. As an example, an operating temperature of a reactor may be greater than 374° C. For example, the operating temperature of the reactor may be greater than 200° C., greater than 225° C., greater than 250° C. greater than 275° C., greater than 300° C., greater than 325° C., greater than 350° C., greater than 375° C., greater than 400° C., greater than 425° C., greater than 450° C., greater than 475° C., greater than 500° C., greater than 525° C., greater than 550° C., or greater than 575° C. The operating temperature of the reactor may be less than 750° C., less than 725° C., less than 700° C., less than 675° C., less than 650° C., less than 625° C. or less than 600° C. As an example, an operating temperature of a reactor may be greater than 200° C. and less than 750° C. As an example, an operating temperature of a reactor is from about 400° C. to about 650° C.

As an example, an operating pressure of a reactor may be greater than 60 atm, greater than 70 atm, greater than 80 atm, greater than 90 atm, greater than 100 atm, greater than 110 atm, greater than 120 atm, greater than 130 atm, greater than 140 atm, greater than 150 atm, greater than 160 atm, greater than 170 atm, greater than 180 atm, greater than 190 atm, greater than 200 atm, greater than 210 atm, greater than 220 atm, greater than 230 atm, or greater than 240 atm. As an example, an operating pressure of a reactor is greater than 2.18 attn. As an example, an operating pressure of a reactor is greater than 260 atm. As an example, an operating pressure of the reactor may be less than 500 atm, less than 475 atm, less than 450 atm, less than 425 atm, less than 400 atm, less than 375 atm, less than 350 atm, less than 325 atm, less than 300 atm, less than 275 atm, less than 250 atm, less than 225 atm, less than 200 atm, less than 175 atm, or less than 150 atm.

B. Waste Streams

Waste processing systems and methods disclosed herein can be configured to process various types of waste in waste streams. Treatable waste streams include those having high chemical oxygen demand (COD) and/or biological oxygen demand (BOD). Treatable waste streams include hazardous industrial wastes. For example, waste streams may include, but are not limited to, chemical weapons, PCBs, chlorinated solvents, coking wastewater, landfill leachate, oily wastes, dye-house wastewater, and sewage sludge, which may include human waste, fecal slurry, and/or animal waste, Waste streams typically enter a reactor at temperatures lower than the temperature of the oxidizing material. As an example, waste streams may be provided to a reactor at a temperature less than 250° C., less than 240° C., less than 230° C., less than 220° C., less than 210° C., or less than 200° C.

C. Oxidizing Material

Oxidizing material includes one or more oxidants and, in some implementations, water. Example oxidants include, but are not limited to, air, a mixture of oxygen ($O_2$) and nitrogen ($N_2$), and oxygen ($O_2$). The phase(s) of the oxidizing material stream depends on the temperature, pressure, and constituents of the oxidizing material stream.

Oxidizing material typically enters a reactor at temperatures higher than the temperature of the waste stream. The temperature of oxidizing material entering a reactor can be selected based on constituents of the oxidizing material and based on the desired operating conditions within the reactor (e.g., supercritical or subcritical). As an example, oxidizing material may be provided to a reactor at a temperature of from about 300° C. to about 700° C. As an example, oxidizing material is provided to a reactor at a temperature of from about 550° C. to about 650° C. As an example, oxidizing material is provided to a reactor at a temperature of from about 600° C. to about 630° C. As an example, oxidizing material is provided to a reactor at a temperature of greater than 300° C., greater than 350° C., greater than 400° C., greater than 450° C., greater than 500° C., greater than 550° C., or greater than 650° C. As an example, oxidizing material is provided to a reactor at a temperature of less than 700° C., less than 650° C., less than 620° C., less than 570° C., less than 520° C., less than 470° C., less than 420° C., less than 370° C., or less than 320° C.

D. Flow Rates

Flow rates of waste streams and oxidizing material can be modified to attain desired processing targets. Similarly, flow rates of reactor effluent streams through system components can be adjusted to obtain desired objectives, such as, for instance, heat transfer, separation percentages, and mechanical output.

As an example, a system designed to treat fecal waste from 1,000 people per day, a waste stream flow rate to the reactor may be 1-2 $m^3$/day (roughly 40-80 kg/h) and an oxidant flow rate may be 900-1800 $m^3$/day (roughly 90-180 kg/h). These numbers can be scaled up for treating fecal waste from 10,000 people per day, from 50,000 people per day, or from 200,000 people per day.

F. Mixing Units

At a reactor inlet end, the waste stream and oxidizing material stream are combined in a mixing unit and introduced into the reactor. The waste stream and oxidizing material stream can be combined in various ways. For example, the mixing unit may have two inputs—one input may be used for the waste stream and the other input is used for the oxidizing material stream. Various relative angles of the two inputs may be used, such as, T-shaped, Y-shaped, and V-shaped.

Utilizing a mixing unit can have various benefits, particularly, in supercritical conditions. As a possible example, fouling and corrosion can be limited because the configuration obviates a need for slow heating of the waste stream through subcritical and transition temperature regions. As a possible example, the configuration can result in high conversion rates and a cleaner reaction because rapid heating to supercritical conditions can avoid gasification. As a possible example, the configuration can be safer because separate oxidizing material and waste stream lines provide a way to limit temperature increases or quench a runaway reaction.

E. Heat Exchangers

One or more heat exchangers may be utilized in waste processing systems and methods disclosed herein. Each heat exchanger can be sized and configured to obtain desired heat transfer conditions. In systems including multiple heat exchangers, each heat exchanger may have different size and configuration.

III. Example Systems

Figure 1:
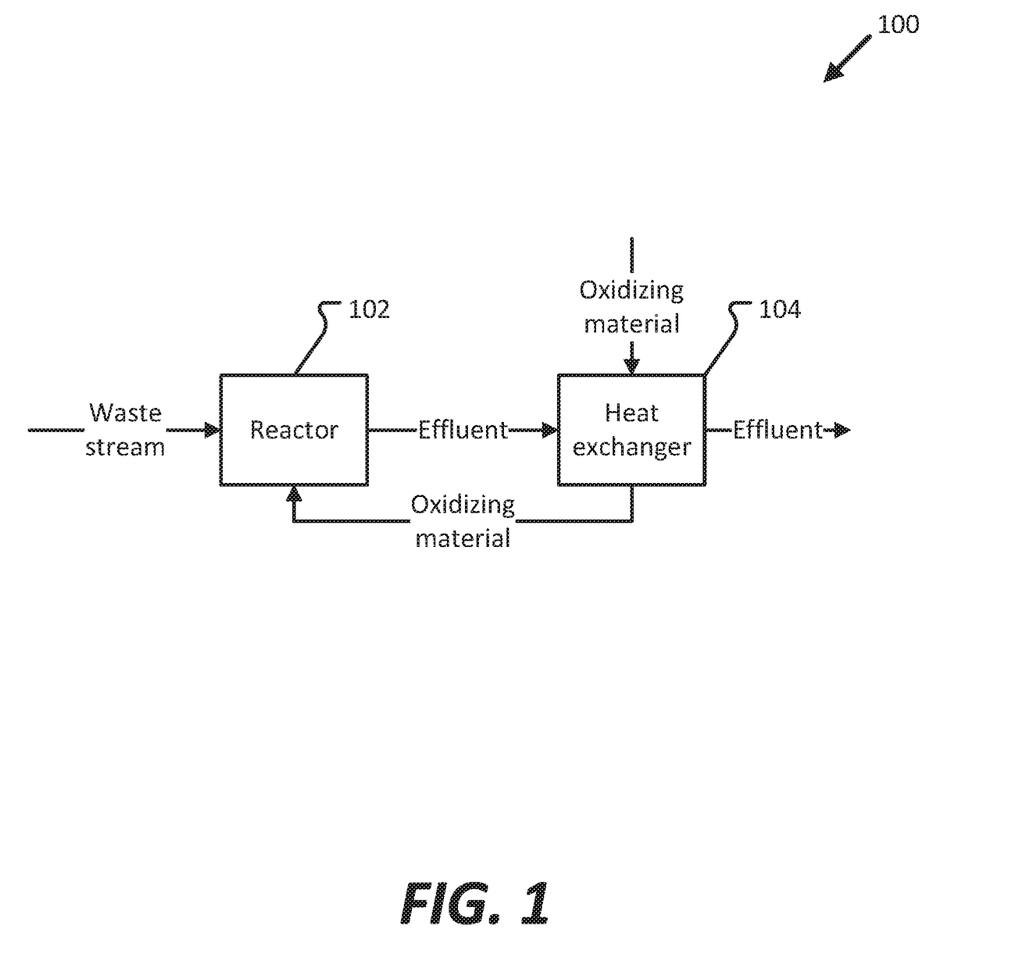
FIG. 1 is a schematic diagram of an example waste processing system.

FIG. 1 is a schematic diagram of example waste processing system 100. Waste processing system 100 is configured to process a waste stream and generate effluent that can be further processed. Reactor effluent can be separated into solid components and aqueous components in subsequent processing. Although typically the solid components include minerals, it will be appreciated that the constituents of the solid components depend on the nature and makeup of the waste stream being processed.

Broadly speaking, waste processing system 100 includes reactor 102 and heat exchanger 104. In some implementations, reactor 102 is a tubular reactor. At an inlet end of reactor 102, a waste stream mixes with oxidizing material.

The waste stream is also provided to reactor 102 via one or more additional inputs positioned between the inlet end and the reactor end of reactor 102. Usually, waste streams provided to the inlet end of reactor 102 are slurries or single phase solutions.

At the reactor inlet end, the waste stream and oxidizing material stream are combined in a mixing unit and introduced into reactor 102. One or more additional waste stream inputs are positioned along the length of reactor 102 between the reactor inlet end and the reactor outlet end. In some implementations, the one or more additional waste stream inputs are equally spaced along the length of reactor 102. In some implementations, flow rates to the waste stream inputs increase along the length of reactor 102, such that each waste stream input has a greater flow rate than the waste stream input(s) upstream.

In an example embodiment, reactor 102 includes two waste stream inputs: one at the reactor inlet end and a second positioned downstream of the reactor inlet end. In an example embodiment, reactor 102 includes three waste stream inputs: one at the reactor inlet end and two more positioned downstream of the reactor inlet end. In an example embodiment, reactor 102 includes four waste stream inputs: one at the reactor inlet end and three more positioned downstream of the reactor inlet end. In an example embodiment, reactor 102 includes five waste stream inputs: one at the reactor inlet end and four more positioned downstream of the reactor inlet end. In an example embodiment, reactor 102 includes six waste stream inputs: one at the reactor inlet end and five more positioned downstream of the reactor inlet end. In an example embodiment, reactor 102 includes seven waste stream inputs: one at the reactor inlet end and six more positioned downstream of the reactor inlet end. In example embodiments, reactor 102 includes seven, eight, nine, or ten waste stream inputs: one waste stream input at the reactor inlet end and the remainder positioned downstream of the reactor inlet end.

Reactor 102 is in fluid communication with heat exchanger 104. Heat exchanger 104 includes a hot fluid circuit that includes a hot input and hot output and a cold fluid circuit that includes a cold input and a cold output. An outlet end of reactor 102 discharges reactor effluent that is then provided to a hot input of heat exchanger 104. Oxidizing material is provided to a cold input of heat exchanger 104. In turn, oxidizing material discharged from heat exchanger 104 is provided to reactor 102.

Reactor effluent enters the hot input of heat exchanger 104 at a first temperature and is discharged from the hot output of heat exchanger 104 at a second temperature, where the second temperature is lower than the first temperature. Oxidizing material enters the cold input of heat exchanger 104 at a first temperature and is discharged from the cold output of heat exchanger 104 at a second temperature, where the second temperature is greater than the first temperature.

Figure 2:
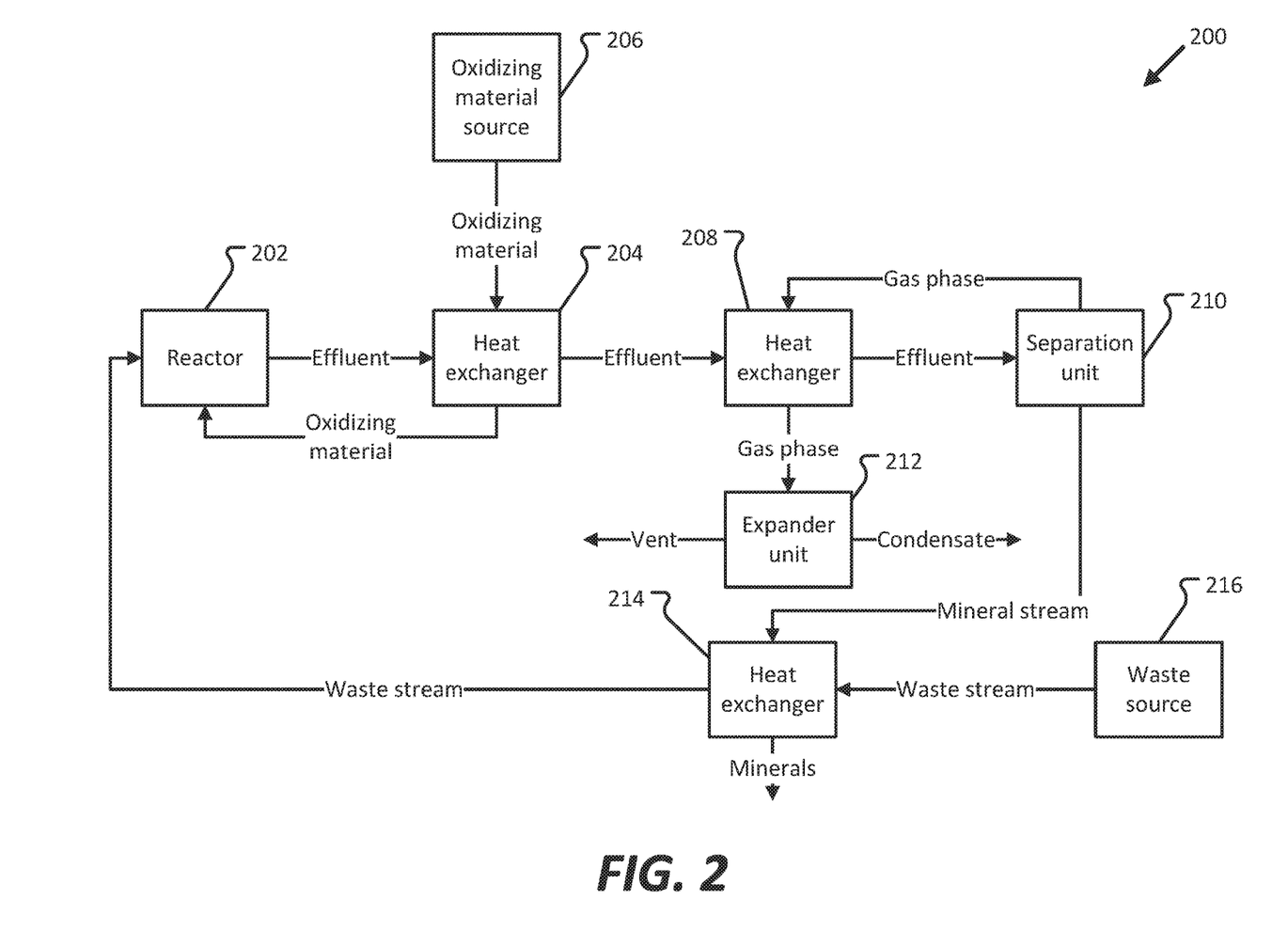
FIG. 2 is a schematic diagram of another example waste processing system.

FIG. 2 is a schematic diagram of example waste processing system 200. Waste processing system 200 is configured to process a waste stream and includes energy recovery components. As shown, waste processing system 200 includes reactor 202, heat exchanger 204, oxidizing material source 206, heat exchanger 208, separation unit 210, expander 212, heat exchanger 214, and waste source 216. Reactor 202 and heat exchanger 204 include configurations and parameters of reactor 102 and heat exchanger 104, respectively, described above. Other embodiments can include more or fewer components than those shown in FIG. 2 and discussed below.

Waste source 216 provides a waste stream to reactor 202, where the temperature of the waste stream from waste source 216 is increased in heat exchanger 214 prior to introduction to reactor 202. In some instances, multiple pumps can be utilized to provide a waste stream to the multiple waste stream inputs of reactor 202. In some instances, a manifold (such as a header) can be used to provide a waste stream to the multiple waste stream inputs of reactor 202, where the manifold is in fluid communication with one or more pumps.

Oxidizing material source 206 provides oxidizing material to reactor 202, where the temperature of the oxidizing material from oxidizing material source 206 is increased in heat exchanger 204 prior to introduction to reactor 202.

Heat exchanger 208 is in fluid communication with heat exchanger 204 and separation unit 210. Heat exchanger 204 includes a hot fluid circuit that includes a hot input and hot output and a cold fluid circuit that includes a cold input and a cold output. The hot input of heat exchanger 208 is configured to receive effluent from the hot output of heat exchanger 204. The cold input of heat exchanger 208 is configured to receive a gaseous phase from separation unit 210, discussed in greater detail below. The hot output of heat exchanger 208 provides effluent to the separation unit 210. The cold output of heat exchanger provides the gaseous phase to expander 212, discussed in greater detail below.

Effluent received at the hot input of heat exchanger 208 is at a greater temperature than the effluent discharged from the hot output of heat exchanger 208. Relatively, effluent entering heat exchanger 204 is at a higher temperature than effluent entering heat exchanger 208, which is at a higher temperature than effluent entering separation unit 210. Gaseous phase received at the cold input of heat exchanger 208 is at a lower temperature than the gaseous phase discharged from the cold output of heat exchanger 208.

Separation unit 210 separates mineral components from gaseous components in the effluent stream. In some implementations, separation unit 210 operates at high temperatures and/or high pressures. Separation unit 210 can operate at temperatures greater than 120° C. and up to 600° C. Separation unit 210 can operate at pressures greater than 60 atm and up to 260 atm. Typically, separation unit 210 operates at lower pressures and temperatures than reactor 202 outlet pressure and temperature.

Separation unit 210 includes an input, a first output, and a second output, where the first output discharges gaseous components and the second output discharges mineral components. The input of separation unit 210 is in fluid communication with the hot output of heat exchanger 208. The first output of separation unit 210 is in fluid communication with the cold input of heat exchanger 208. The second output of separation unit 210 is in fluid communication with heat exchanger 214.

Expander unit 212 can produce energy from expansion of a received gaseous phase stream. In some instances, expander unit 212 can be mechanically coupled to an energy recovery unit, such as a compressor. Typically, expander unit 212 is a single stage or two stage unit. Expander unit 212 receives a gaseous phase stream from heat exchanger 208. From that gaseous phase stream, expander unit 212 generates a vent stream including gaseous components, such as $N_2$, $CO_2$, and $O_2$. Expander unit 212 also generates a condensate stream, which can include water ($H_2O$). Water discharged from expander unit 212 is relatively free from contaminants.

Heat exchanger 214 is in fluid communication with waste source 216 and separation unit 210. Heat exchanger 214 includes a hot fluid circuit that includes a hot input and hot output and a cold fluid circuit that includes a cold input and a cold output. The hot input of heat exchanger 214 is configured to receive a mineral stream from separation unit 210. The cold input of heat exchanger 214 is configured to receive a waste stream from waste source 216. The hot output of heat exchanger 208 discharges minerals for subsequent processing and/or disposal. The cold output of heat exchanger provides the waste stream to reactor 202. In some implementations, a heater unit is provided between heat exchanger 214 and reactor 202 to heat the waste stream during startup conditions.

A mineral stream received at the hot input of heat exchanger 214 is at a greater temperature than the mineral stream discharged from the hot output of heat exchanger 214. Waste stream received at the cold input of heat exchanger 214 is at a lower temperature than the waste stream discharged from the cold output of heat exchanger 214.

IV. Example Method for Operating a Waste Processing System

Waste processing systems disclosed and contemplated herein can be used during an example method for operating a waste system. Temperatures, pressures, and flow rates disclosed herein may be used during operation of the example method. The example method begins by providing a waste stream and oxidizing material to a mixing unit of a reactor such that a mixture of the waste stream and the oxidizing material downstream of the mixing unit is at a temperature no less than 200° C. In some implementations of the example method, the operating temperature of the reactor is no less than 374° C. and no greater than 600° C. In some implementations of the example method, a solids percentage of the waste stream is no greater than 30%. In some implementations, the oxidizing material does not include a water component.

The example method also includes providing the waste stream to an additional waste stream input of the reactor. The additional waste stream input is positioned downstream of the mixing unit. The waste stream is provided to the mixing unit at a first flow rate and to the additional waste stream input at a second flow rate. In some implementations, the first flow rate is equal to the second flow rate. In some implementations, the second flow rate is greater than the first flow rate. In some implementations, the first flow rate is greater than the second flow rate.

In some implementations, the waste stream is provided to a plurality of waste stream inputs positioned downstream of the mixing unit. The plurality of waste stream inputs can include, in various implementations, 1 additional waste stream input; 2 additional waste stream inputs; 3 additional waste stream inputs; 4 additional waste stream inputs; 5 additional waste stream inputs; 6 additional waste stream inputs; 7 additional waste stream inputs; or 8 additional waste stream inputs, to name a few possibilities. The waste stream can be provided to the additional waste stream input and the plurality of waste stream inputs equally. The waste stream can be provided to the additional waste stream input and the plurality of waste stream inputs such that each waste stream input has a greater flow rate than any upstream waste stream input.

The example method can also include operating a first heat exchanger unit, a second heat exchanger unit, a separation unit, and a third heat exchanger unit in the waste processing system.

At the first heat exchanger unit, the method includes providing a reactor effluent from the reactor to a first heat exchanger hot input and providing the oxidizing material at a first oxidizing material temperature to a first heat exchanger cold input. From a first heat exchanger cold output, oxidizing material at a second oxidizing material temperature is provided to the mixing unit of the reactor, where the second oxidizing material temperature is greater than the first oxidizing material temperature. From a first heat exchanger hot output, first heat exchanger effluent is provided to a second heat exchanger unit, where the first heat exchanger effluent has a first heat exchanger effluent temperature that is less than a reactor effluent temperature.

At the second heat exchanger unit, the method includes receiving a gaseous phase at a first gaseous phase temperature to a second heat exchanger cold input and receiving the first heat exchanger effluent at a second heat exchanger hot input. The gaseous phase at a second gaseous phase temperature is discharged from a second heat exchanger cold output, where the second gaseous phase temperature is greater than the first gaseous phase temperature. From a second heat exchanger hot output, second heat exchanger effluent is provided to the separation unit, where the second heat exchanger effluent has a second heat exchanger effluent temperature that is less than the first heat exchanger effluent temperature.

At the separation unit, the method includes separating gaseous components from mineral components in the second heat exchanger effluent, providing the gaseous phase including the gaseous components to the second heat exchanger cold input, and providing a mineral stream including the mineral components to the third heat exchanger unit.

At the third heat exchanger unit, the method includes receiving the mineral stream at a third heat exchanger hot input and at a third heat exchanger cold input, receiving the waste stream at a first waste stream temperature. At a third heat exchanger hot output, the mineral stream is discharged. The waste stream at a second waste stream temperature is provided to the mixing unit of the reactor, where the second waste stream temperature is greater than the first waste stream temperature.

The method can also include providing the gaseous phase at the second gaseous phase temperature to an expander unit. From a first expander unit output, vent gas components of the gaseous phase are discharged. From a second expander unit output, a water component of the gaseous phase is discharged.

V. Example Theoretical Chemistry During Processes and Techniques Characterized Herein Without being bound by a particular theory, it is theorized that the following reactions take place during one or more of the processes and techniques characterized herein. For implementations where fecal slurry is in the waste stream, the following general reaction occurs in a reactor:

$$\text{Fecal Slurry} + O_2 \rightarrow CO_2 + H_2O + N_2 + \text{minerals} + \text{heat} \qquad (1)$$

As a prophetic example, according to reaction (1), a feed including 1 m³ (including 150 kg dry mass) of fecal slurry and 900 m³ of air comprising $O_2$ and $N_2$ (180 kg $O_2$ and 900 kg $N_2$) generates 150 m³ of $CO_2$ (240 kg), 0.9 m³ of $H_2O$ (900 kg), 780 m³ of $N_2$ (930 kg), 30-50 kg of minerals, and about 2250 MJ of heat.

VI. Experimental Examples

Experimental examples were conducted and the results are discussed below.

A. Prophetic Waste Processing System Experimental Example

Figure 3A:
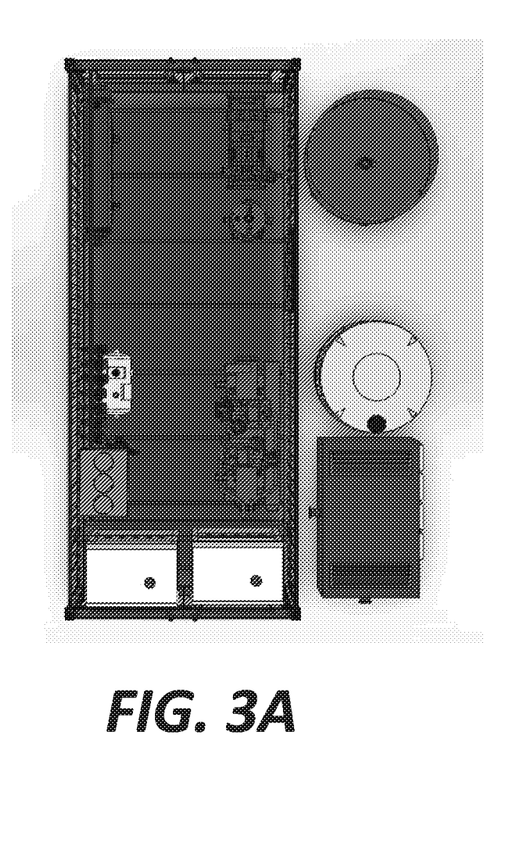
FIG. 3A is a top view of an example embodiment of the waste processing system.
Figure 3B:
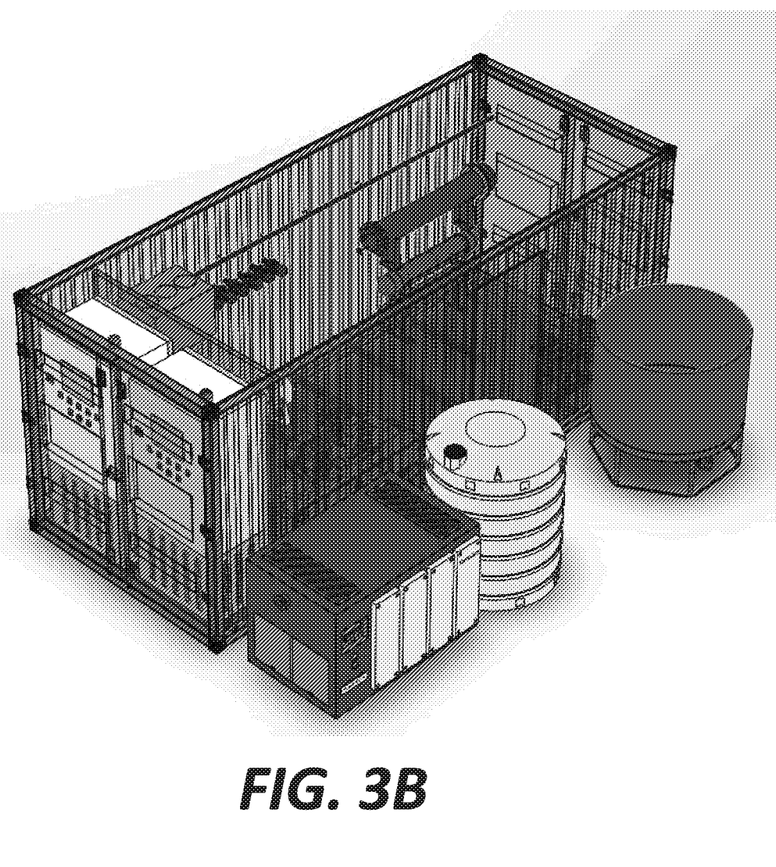
FIG. 3B is a perspective view of the example embodiment shown in FIG. 3A.

In a first experimental example, a waste processing system was modeled using Aspen Plus™ software (Aspen Technology, Inc., Bedford, Mass.). The waste processing system of this experimental example included the components of the system shown in FIG. 2. The reactor in the experimental example included a waste stream input at a mixing unit positioned to feed the reactor inlet, plus an additional seven waste stream inputs positioned downstream, for a total of eight waste stream inputs. An example configuration of the system components were arranged as depicted in FIGS. 3A and 3B.

The experimental example was modeled with a single stage expander and a two stage expander. Certain performance characteristics of those two systems are provided in Table 1, below.

TABLE 1

Performance characteristics of experimental examples including either a single stage expander or a two stage expander.

| Design | Min % solids | Total Energy Draw (kW) | Energy Recovered (kW) | Net Energy Draw at SS (kWe) | Energy Draw per User (Wh/pp day) | Water Generated (m³/day) |
|---|---|---|---|---|---|---|
| 6,000 person unit with expander | 15% | 59 | 50 | 9.0 | 36 | 2.6 |
| 30,000 person unit with Expander | 15% | 290 | 305 | −8.5 | −7 | 13 |

Figure 4:
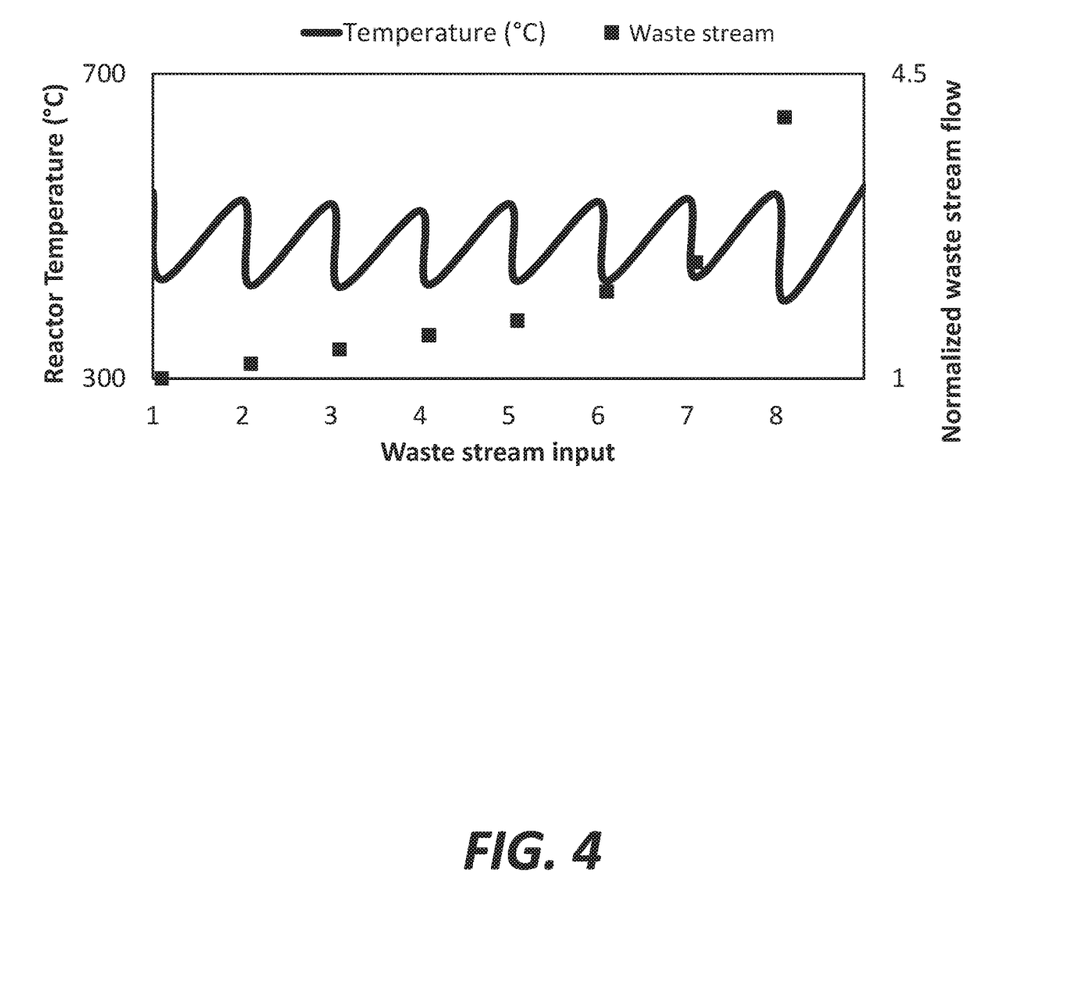
FIG. 4 is a chart showing example operating parameters for an example embodiment of a waste processing system.

FIG. 4 shows conditions within the waste processing system. The x-axis is the length of the reactor and each waste stream input is indicated. The left y-axis shows the temperature inside the reactor. The right y-axis shows a normalized waste stream flow, where the flow rate at the first waste stream input is taken to be 1.

As shown in FIG. 4, the relatively small flow rate of the waste stream at the first input is not enough to lower the temperature in the reactor such that reactions are quenched. Each subsequent waste stream input has a higher flow rate than the waste stream input(s) upstream.

B. Prophetic Modeling Projections for Autothermal Operation

Figure 5:
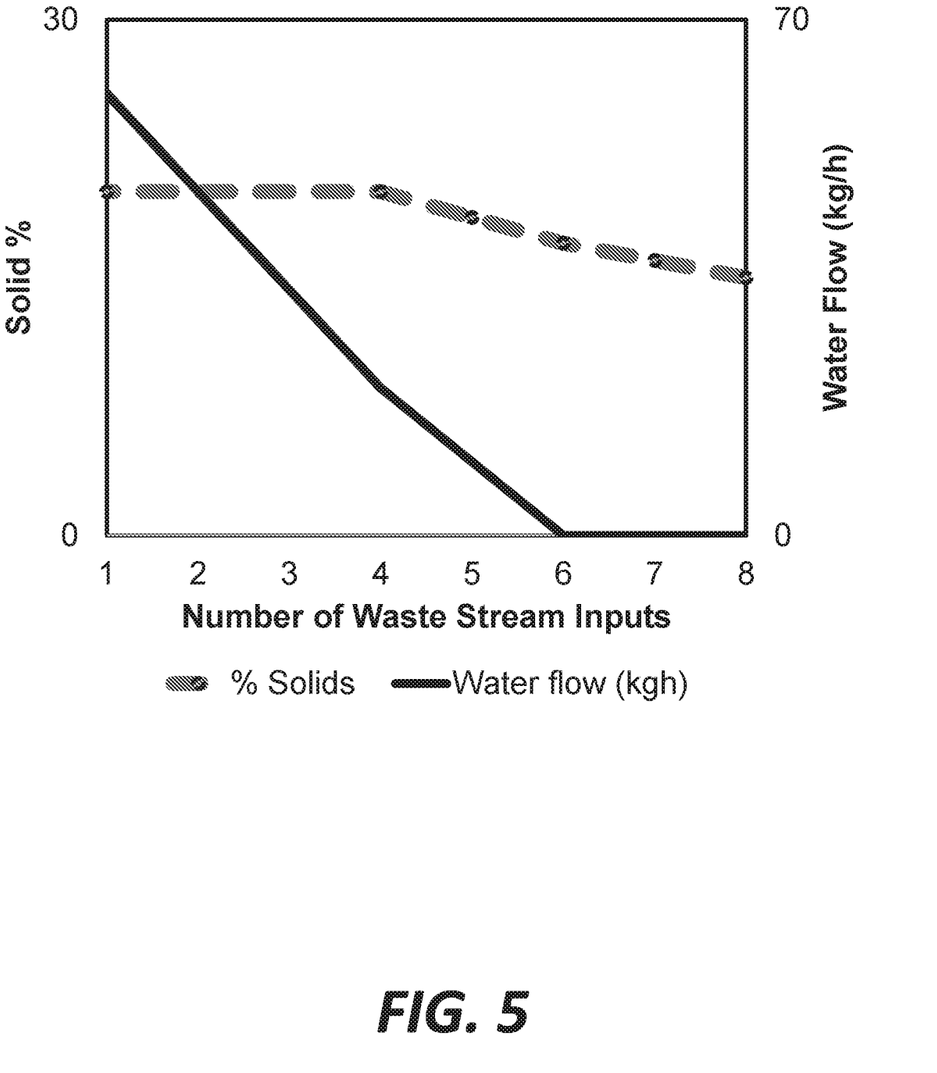
FIG. 5 is a chart showing example operating parameters for an example embodiment of a waste processing system.

FIG. 5 shows prophetic modeling projections for autothermal operation of a waste processing system operating at supercritical conditions. In FIG. 5, a number of waste stream inputs to a reactor in a waste processing stream was varied from 1 to 8. On the left y-axis, a minimum solids percentage in the waste stream for operation is provided and the dashed line shows the resulting data. On the right y-axis, a water flow (kg/h) in the oxidizing material stream is provided.

As seen in FIG. 5, increasing the number of waste stream inputs to the reactor results in an expanded window of solids percentage. Put another way, the required calorific value of the waste stream decreases as the number of waste stream inputs increases from 1 to 8. With lower solids percentage or lower calorific value required in the waste stream, there are more types of waste that can be processed.

As also seen in FIG. 5, a required amount of recycled water in the oxidizing material stream decreases with the number of waste stream inputs. Indeed, there appears to be no need for water in the oxidizing material stream at 6-, 7-, and 8-waste stream input configurations. Reducing or eliminating water can avoid corrosion in subcritical zones and also can improve the energy efficiency of the system.

Starting around configurations with at least 4 waste stream inputs, the water/air heat exchanger duty decreases by 60% or even 80%. Having lower heat exchanger duty can reduce capital expenditures.

C. Pilot Scale Experimental Example

A pilot scale experimental example waste processing system was constructed and tested. The experimental pilot system included a reactor configured to operate at no less than 380° C., a first heat exchanger, a second heat exchanger, and a separation/expansion unit. The reactor included a mixing unit that fed a reactor inlet, where the mixing unit was configured to receive oxidizing material and waste slurry. An additional waste slurry input was positioned downstream of the mixing unit. The system was not particularly designed and configured to be optimized for energy efficiency.

The experimental pilot system was sized to process the equivalent of approximately 1,000 people's waste per day. More particularly, the experimental pilot system processed 100-150 kg dry solids per day, which was roughly equivalent to 1-2 m³ of slurry per day. Waste slurry provided to the system had 5-20% solids content. The reactor inner diameter was 19 mm and had a length of 4.0 m. The heat exchangers length totaled 39 m. Estimated reaction time was between 2.5 seconds and 4.5 seconds.

The reactor received waste slurry having a temperature between 200-250° C. and oxidizing material having a temperature between 550-660° C. Oxidizing material included a mixture of water and air provided from a water tank and air compressor, respectively. The air components included 30% excess oxygen from the minimum stoichiometric amount. The water/air mixture was provided to the first heat exchanger cold input and the first heat exchanger hot input received reactor effluent. Waste slurry from a sludge tank was provided to a cold input of the second heat exchanger. Effluent from the first heat exchanger hot output was provided to the second heat exchanger hot input. The second heat exchanger cold output was in fluid communication with the reactor mixing unit that was configured to receive the oxidizing material and the slurry.

Effluent from the second heat exchanger hot output had a temperature of about 180° C. and was provided to a separation/expansion unit. The separation/expansion unit included a gas stream including $CO_2$ and $N_2$ and a different stream including clean water effluent. The clean water effluent was provided to the water tank for reuse in the system.

1. Secondary Sludge Trials

Figure 6A:
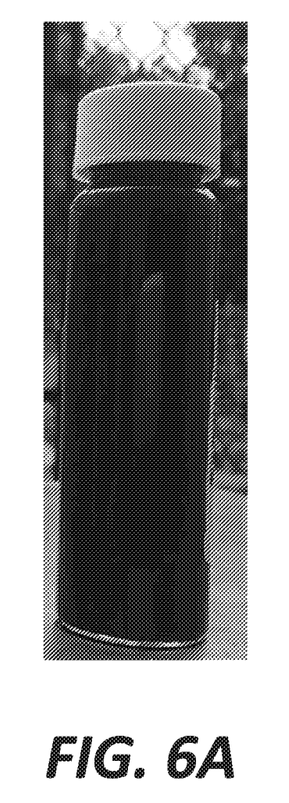
FIGS. 6A, 6B, and 6C are photographs of reactor influent, reactor effluent, and reactor effluent after settling, respectively, for a waste stream including secondary sludge processed with an example embodiment of a waste processing system.
Figure 6B:
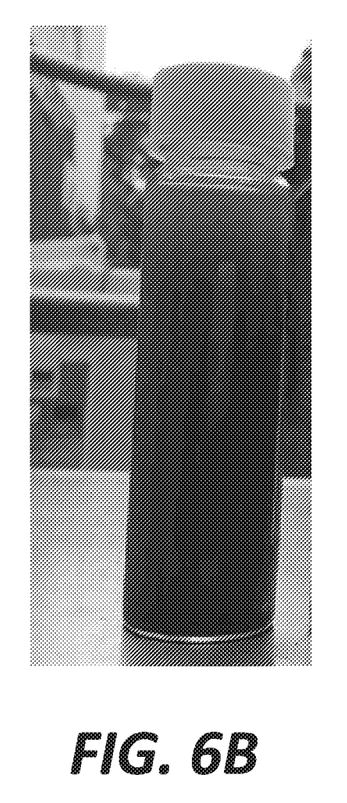
Figure 6C:
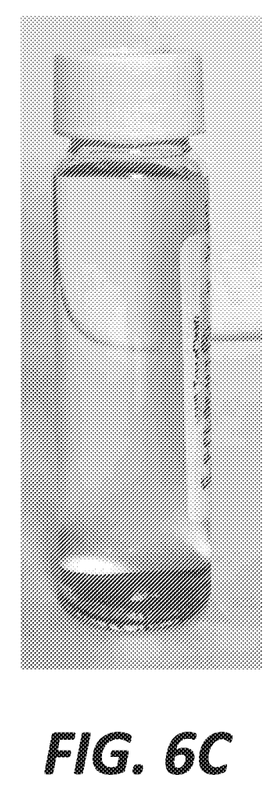

In a trial of the experimental pilot system, secondary sludge was provided as the sludge. The dry solids content was 16%, with ash content of 20-24% or dry matter by weight and estimated calorific value of 15 $MJ/kg_{dry}$. The sludge was diluted to 4-10% solids and mixed with isopropyl alcohol to increase calorific value of the slurry. FIG. 6A shows a sample vial of the diluted secondary sludge slurry feed. FIG. 6B shows a sample vial of reactor effluent. FIG. 6C shows a sample vial of the effluent after settling.

Table 2 shows a data summary of a trial run where the reactor influent included 3% secondary sludge and 9% isopropyl alcohol (IPA).

TABLE 2

Secondary sludge slurry treatment summary.

| Analysis | Influent (3% sludge + 9% IPA) | Effluent (steady state) | Removal (%) |
|---|---|---|---|
| COD (mg/L) | 214,000 | 70 | 99.97 |
| Total N (mg/L) | 10,875 | 200 | 98.16 |
| $NH_3$ (mg/L) | 443 | 17.6 | |
| $NO_3$ (mg/L) | 183 | 15.9 | |
| $NO_2$ (mg/L) | 14.9 | 0.4 | |
| $PO_4^{-3}$ (mg/L) | 4930 | 67.9 | 98.62 |
| pH | 6.8 | 7.02 | |
| Conductivity (μS/cm) | 2560 | 659 | |

2. Dog Feces Trials

Figure 7A:
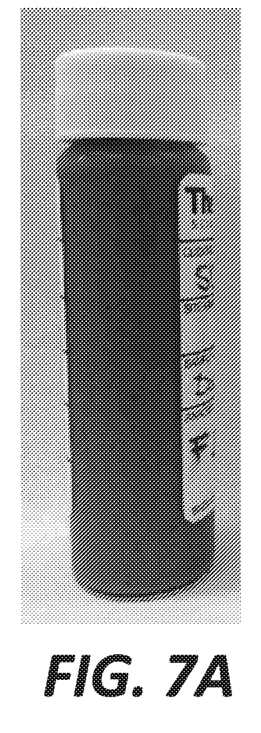
FIGS. 7A, 7B, and 7C are photographs of reactor influent, reactor effluent, and reactor effluent after settling, respectively, for a waste stream including dog feces processed with an example embodiment of a waste processing system.
Figure 7B:
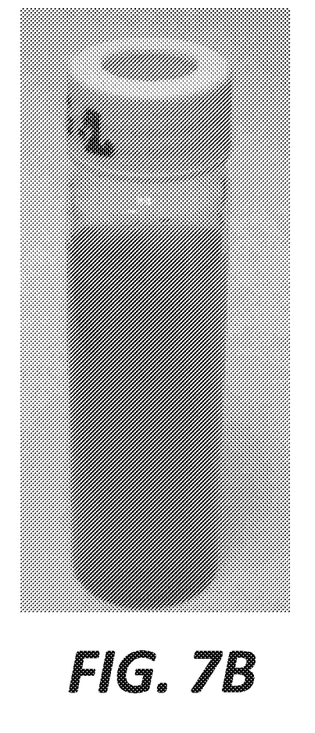
Figure 7C:
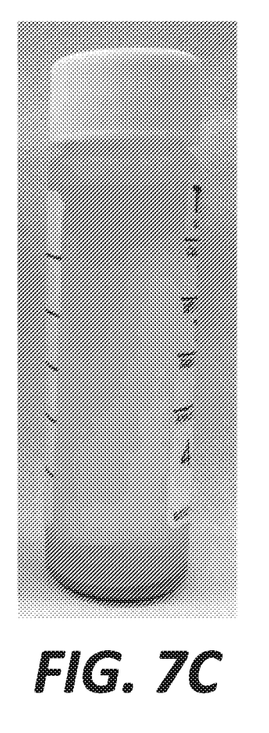

In another trial of the experimental pilot system, dog feces were provided as the sludge. The dry solids content was 20-30%, with ash content of about 27% of dry matter by weight and estimated calorific value of 15.7 MJ/$kg_{dry}$. The sludge was diluted to 4-10% solids and mixed with isopropyl alcohol to increase calorific value of the slurry. FIG. 7A shows a sample vial of the diluted dog feces slurry feed. FIG. 7B shows a sample vial of reactor effluent. FIG. 7C shows a sample vial of the effluent after settling.

Table 3 shows a data summary of a trial run where the reactor influent included 10% dog feces and 4% isopropyl alcohol (IPA).

TABLE 3

Dog feces slurry treatment summary.

| Analysis | Influent (10% feces + 4% IPA) | Effluent (steady state) | Removal (%) |
|---|---|---|---|
| COD (mg/L) | 192,000 | 65-280 | 99.97-99.85 |
| Total N (mg/L) | 4704 | 220-420 | 95.32-91.70 |
| $NH_3$ (mg/L) | 627 | 185-325 | |
| $NO_3$ (mg/L) | 98 | 0.3-0.8 | |
| $NO_2$ (mg/L) | 22.5 | 0.04-0.54 | |
| $PO_4^{-3}$ (mg/L) | 14,500 | 13.4-63.9 | 99.91-99.56 |
| pH | 5.95 | 7.4 | |
| Conductivity (μS/cm) | 4500 | 153 | |

3. Experimental Example of Subcritical Conditions

During a trial run using the experimental pilot system described above, subcritical conditions inside the reactor were maintained for a period of time. The reactor pressure was 20.9 atm and an average reactor temperature was 464° C. Air flow rate was 47.4 kg/hr, water flow rate was 24 kg/hr, and sludge flow rate was 15.4 kg/hr to the mixing unit. Sludge flow rate to the additional waste stream input was 12.2 kg/hr. Temperatures along the reactor length were measured at, starting from nearest the reactor inlet, 534° C., 525° C., 546° C., 533° C., 364° C., 398° C., and 419° C. The observed temperature dip is an indication of the cold sludge stream mixed with the hot oxidizer stream where the temperature gain on the sequential temperature sensor indicates the exothermic oxidation reaction that occurs from the chemical oxidizing of the organic waste to water and CO2 releases energy in a form of heat.

EMBODIMENTS

For reasons of completeness, various aspects of the disclosure are set out in the following numbered embodiments:

Embodiment 1

A waste processing system, comprising:
a reactor, comprising:
    a reactor inlet end including a mixing unit, the mixing unit having a reactor oxidizing material input and a first waste stream input, the reactor oxidizing material input configured to receive reactor oxidizing material at a temperature greater than 200° C. and at a pressure greater than 60 atm;
    a reactor outlet end configured to discharge reactor effluent; and
    a second waste stream input positioned between the reactor inlet end and the reactor outlet end.

Embodiment 2

The waste processing system according to embodiment 1, further comprising a first heat exchanger in fluid communication with the reactor, the first heat exchanger including:
    a first heat exchanger hot input configured to receive the reactor effluent at a first effluent temperature;
    a first heat exchanger cold input configured to receive reactor oxidizing material at a first reactor oxidizing material temperature;
    a first heat exchanger cold output configured to provide the reactor oxidizing material at a second reactor oxidizing material temperature to the reactor oxidizing material input, wherein the second reactor oxidizing material temperature is greater than the first reactor oxidizing material temperature; and
    a first heat exchanger hot output configured to discharge effluent at a second effluent temperature, the second effluent temperature being less than the first effluent temperature.

Embodiment 3

The waste processing system according to embodiment 2, further comprising a second heat exchanger, the second heat exchanger including:
    a second heat exchanger hot input configured to receive the effluent at the second effluent temperature;
    a second heat exchanger cold input configured to receive a gaseous phase;
    a second heat exchanger cold output configured to discharge a higher temperature gaseous phase; and
    a second heat exchanger hot output configured to discharge effluent at a third effluent temperature, the third effluent temperature being less than the second effluent temperature.

Embodiment 4

The waste processing system according to embodiment 3, further comprising a separation unit configured to separate gaseous components from the effluent at the third effluent temperature, the separation unit including:
    a separation unit input;
    a separation unit first output; and
    a separation unit second output, the separation unit input being in fluid communication with the second heat exchanger hot output;

the separation unit first output being in fluid communication with the second heat exchanger cold input and configured to discharge the gaseous phase; and the separation unit second output being configured to discharge a mineral stream.

Embodiment 5

The waste processing system according to embodiment 4, further comprising a third heat exchanger, the third heat exchanger including:
a third heat exchanger hot input configured to receive the mineral stream from the separation unit;
a third heat exchanger cold input configured to receive a waste stream at a first waste stream temperature;
a third heat exchanger cold output configured to discharge the waste stream at a second waste stream temperature that is greater than the first waste stream temperature; and
a third heat exchanger hot output configured to discharge the mineral stream.

Embodiment 6

The waste processing system according to embodiment 5, further comprising an expander unit, including:
an expander unit input configured to receive the higher temperature gaseous phase from the second heat exchanger;
wherein the expander unit is configured to discharge a vent gas component of the higher temperature gaseous phase; and
wherein the expander unit is configured to discharge a water component of the higher temperature gaseous phase.

Embodiment 7

The waste processing system according to any one of embodiments 1-6, further comprising a plurality of additional waste stream inputs, each of the plurality of additional waste stream inputs being positioned between the reactor inlet end and the reactor outlet end.

Embodiment 8

The waste processing system according to embodiment 7, wherein each of the plurality of additional waste stream inputs and the second waste stream input are equally spaced along a length of the reactor.

Embodiment 9

The waste processing system according to embodiment 8, further comprising a waste stream source in fluid communication with each of the first waste stream input, the second waste stream input, and the plurality of additional waste stream inputs, the waste stream source configured to provide an equal waste stream flow to each of the first waste stream input, the second waste stream input, and the plurality of additional waste stream inputs.

Embodiment 10

The waste processing system according to embodiment 8, further comprising a waste stream source in fluid communication with each of the first waste stream input, the second waste stream input, and the plurality of additional waste stream inputs, the waste stream source configured to provide a waste stream flow to each of the first waste stream input, the second waste stream input, and the plurality of additional waste stream inputs such that each waste stream input has a greater flow rate than any upstream waste stream input.

Embodiment 11

The waste processing system according to embodiment 8, the plurality of additional waste stream inputs comprising at least one additional waste stream input but no more than five additional waste stream inputs.

Embodiment 12

The waste processing system according to embodiment 1, wherein the reactor oxidizing material input is configured to receive reactor oxidizing material at a temperature greater than 374° C. and at a pressure greater than 218 atm.

Embodiment 13

A method for operating a waste processing system, the method comprising:
providing a waste stream and oxidizing material to a mixing unit of a reactor such that at least a portion of a mixture of the waste stream and the oxidizing material downstream of the mixing unit is at a temperature greater than 200° C.; and
providing the waste stream to an additional waste stream input of the reactor, the additional waste stream input positioned downstream of the mixing unit.

Embodiment 14

The method according to embodiment 13, further comprising,
providing a reactor effluent from the reactor to a first heat exchanger hot input of a first heat exchanger unit;
providing the oxidizing material at a first oxidizing material temperature to a first heat exchanger cold input of the first heat exchanger unit;
providing the oxidizing material from the first heat exchanger cold output at a second oxidizing material temperature to the mixing unit of the reactor, the second. oxidizing material temperature being greater than the first oxidizing material temperature;
providing first heat exchanger effluent to a second heat exchanger unit, the first heat exchanger effluent having a first heat exchanger effluent temperature less than a reactor effluent temperature;
receiving a gaseous phase at a first gaseous phase temperature to a second heat exchanger cold input of the second heat exchanger unit;
receiving the first heat exchanger effluent at a second heat exchanger hot input;
discharging the gaseous phase from a second heat exchanger cold output at a second gaseous phase temperature, the second gaseous phase temperature being greater than the first gaseous phase temperature; and
providing second heat exchanger effluent from a second heat exchanger hot output to a separation unit, the second heat exchanger effluent having a second heat exchanger effluent temperature less than the first heat exchanger effluent temperature.

Embodiment 15

The method according to embodiment 14, further comprising:
separating gaseous components from mineral components in the second heat exchanger effluent in the separation unit;
providing the gaseous components from the separation unit to the second heat exchanger cold input; and
providing a mineral stream from the separation unit to a third heat exchanger unit, the mineral stream including the mineral components;
receiving the mineral stream at a third heat exchanger hot input of the third heat exchanger unit;
receiving the waste stream at a first waste stream temperature at a third heat exchanger cold input;
discharging the mineral stream at a third heat exchanger hot output; and
discharging the waste stream at a second waste stream temperature, the second waste stream temperature being greater than the first waste stream temperature; and
providing the waste stream at the second waste stream temperature to the mixing unit of the reactor.

Embodiment 16

The method according to embodiment 15, further comprising:
providing the gaseous phase at the second gaseous phase temperature to an expander unit; discharging a vent gas component of the gaseous phase from a first expander unit output, discharging a water component of the gaseous phase from a second expander unit output.

Embodiment 17

The method according to any one of embodiments 13-16, wherein an operating temperature of the reactor is greater than 374° C. and less than 600° C.

Embodiment 18

The method according to any one of embodiments 13-17, the waste stream being provided to the mixing unit at a first flow rate and the waste stream being provided to the additional waste stream input at a second flow rate, the second flow rate being greater than the first flow rate.

Embodiment 19

The method according to embodiment 18, further comprising providing the waste stream to a plurality of waste stream inputs positioned downstream of the mixing unit.
wherein the waste stream is provided to each of the plurality of waste stream inputs and the additional waste stream input such that each waste stream input has a greater flow rate than any upstream waste stream input.

Embodiment 20

The method according to embodiment 19, the plurality of stream inputs comprising at least two waste stream inputs;
wherein the oxidizing material does not include a water component.

Embodiment 21:

The method according to any one of embodiments 13-20, wherein a solids percentage of the waste stream is less than 30%.

Embodiment 22

A waste processing system, comprising:
a reactor, comprising:
a reactor inlet end including a mixing unit, the mixing unit having a reactor oxidizing material input and a first waste stream input, the reactor oxidizing material input configured to receive reactor oxidizing material at a temperature greater than 200° C. and at a pressure greater than 60 atm;
a reactor outlet end configured to discharge reactor effluent; and
a plurality of additional waste stream inputs positioned between the reactor inlet end and the reactor outlet end; and
a heat exchanger in fluid communication with the reactor, the heat exchanger including:
a heat exchanger hot input configured to receive the reactor effluent at a first effluent temperature;
a heat exchanger cold input configured to receive a lower temperature reactor oxidizing material;
a heat exchanger cold output configured to provide a higher temperature reactor oxidizing material to the reactor oxidizing material input; and
a heat exchanger hot output configured to discharge effluent at a second effluent temperature, the second effluent temperature being less than the first effluent temperature.

It is understood that the foregoing detailed description and accompanying examples are merely illustrative and are not to be taken as limitations upon the scope of the disclosure.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. A waste processing system, comprising:
a reactor, comprising:
a reactor inlet end comprising a mixing unit, the mixing unit having a reactor oxidizing material input and a first waste stream input, the reactor oxidizing material input receiving reactor oxidizing material at a temperature greater than 200° C. and at a pressure greater than 60 atm;
a reactor outlet end discharging reactor effluent; and
a second waste stream input positioned between the reactor inlet end and the reactor outlet end;
a first heat exchanger in fluid communication with the reactor, the first heat exchanger comprising:
a first heat exchanger hot input receiving the reactor effluent at a first effluent temperature of greater than 200° C.;
a first heat exchanger cold input receiving reactor oxidizing material at a first reactor oxidizing material temperature;

a first heat exchanger cold output providing the reactor oxidizing material at a second reactor oxidizing material temperature to the reactor oxidizing material input, wherein the second reactor oxidizing material temperature is greater than 200° C. and greater than the first reactor oxidizing material temperature; and a first heat exchanger hot output discharging effluent at a second effluent temperature, the second effluent temperature being less than the first effluent temperature; and a second heat exchanger, the second heat exchanger comprising:
a second heat exchanger hot input receiving the effluent at the second effluent temperature;
a second heat exchanger cold input receiving a gaseous phase;
a second heat exchanger cold output discharging a higher temperature gaseous phase; and
a second heat exchanger hot output discharging effluent at a third effluent temperature, the third effluent temperature being less than the second effluent temperature.

2. The waste processing system according to claim 1, further comprising a separation unit configured to separate gaseous components from the effluent at the third effluent temperature, the separation unit comprising:
a separation unit input;
a separation unit first output; and
a separation unit second output,
the separation unit input being in fluid communication with the second heat exchanger hot output;
the separation unit first output being in fluid communication with the second heat exchanger cold input and configured to discharge the gaseous phase; and
the separation unit second output being configured to discharge a mineral stream.

3. The waste processing system according to claim 2, further comprising a third heat exchanger, the third heat exchanger comprising:
a third heat exchanger hot input configured to receive the mineral stream from the separation unit;
a third heat exchanger cold input configured to receive a waste stream at a first waste stream temperature;
a third heat exchanger cold output configured to discharge the waste stream at a second waste stream temperature that is greater than the first waste stream temperature; and
a third heat exchanger hot output configured to discharge the mineral stream.

4. The waste processing system according to claim 3, further comprising an expander unit, comprising:
an expander unit input configured to receive the higher temperature gaseous phase from the second heat exchanger;
wherein the expander unit is configured to discharge a vent gas component of the higher temperature gaseous phase; and
wherein the expander unit is configured to discharge a water component of the higher temperature gaseous phase.

5. The waste processing system according to claim 1, further comprising a plurality of additional waste stream inputs, each of the plurality of additional waste stream inputs being positioned between the reactor inlet end and the reactor outlet end.

6. The waste processing system according to claim 5, wherein each of the plurality of additional waste stream inputs and the second waste stream input are equally spaced along a length of the reactor.

7. The waste processing system according to claim 6, further comprising a waste stream source in fluid communication with each of the first waste stream input, the second waste stream input, and the plurality of additional waste stream inputs, the waste stream source configured to provide an equal waste stream flow to each of the first waste stream input, the second waste stream input, and the plurality of additional waste stream inputs.

8. The waste processing system according to claim 6, further comprising a waste stream source in fluid communication with each of the first waste stream input, the second waste stream input, and the plurality of additional waste stream inputs, the waste stream source configured to provide a waste stream flow to each of the first waste stream input, the second waste stream input, and the plurality of additional waste stream inputs such that each waste stream input has a greater flow rate than any waste stream input located upstream.

9. The waste processing system according to claim 6, the plurality of additional waste stream inputs comprising at least one additional waste stream input but no more than five additional waste stream inputs.

10. The waste processing system according to claim 1, wherein the reactor oxidizing material input is configured to receive reactor oxidizing material at a temperature greater than 374° C. and at a pressure greater than 218 atm.

11. A method for operating a waste processing system, the method comprising:
providing a waste stream and oxidizing material to a mixing unit of a reactor such that at least a portion of a mixture of the waste stream and the oxidizing material downstream of the mixing unit is at a temperature greater than 200° C.;
providing the waste stream to an additional waste stream input of the reactor, the additional waste stream input positioned downstream of the mixing unit providing a reactor effluent from the reactor to a first heat exchanger hot input of a first heat exchanger unit, wherein the reactor effluent has a temperature of greater than 200° C.;
providing the oxidizing material at a first oxidizing material temperature to a first heat exchanger cold input of the first heat exchanger unit providing the oxidizing material from the first heat exchanger cold output at a second oxidizing material temperature to the mixing unit of the reactor, the second oxidizing material temperature being greater than 200° C. and greater than the first oxidizing material temperature;
providing first heat exchanger effluent to a second heat exchanger unit, the first heat exchanger effluent having a first heat exchanger effluent temperature less than a reactor effluent temperature;
receiving a gaseous phase at a first gaseous phase temperature to a second heat exchanger cold input of the second heat exchanger unit;
receiving the first heat exchanger effluent at a second heat exchanger hot input
discharging the gaseous phase from a second heat exchanger cold output at a second gaseous phase temperature, the second gaseous phase temperature being greater than the first gaseous phase temperature; and
providing second heat exchanger effluent from a second heat exchanger hot output to a separation unit, the second heat exchanger effluent having a second heat exchanger effluent temperature less than the first heat exchanger effluent temperature.

12. The method according to claim 11, further comprising:
separating gaseous components from mineral components in the second heat exchanger effluent in the separation unit;
providing the gaseous components from the separation unit to the second heat exchanger cold input; and
providing a mineral stream from the separation unit to a third heat exchanger unit, the mineral stream comprising the mineral components;
receiving the mineral stream at a third heat exchanger hot input of the third heat exchanger unit;
receiving the waste stream at a first waste stream temperature at a third heat exchanger cold input;
discharging the mineral stream at a third heat exchanger hot output; and
discharging the waste stream at a second waste stream temperature, the second waste stream temperature being greater than the first waste stream temperature; and
providing the waste stream at the second waste stream temperature to the mixing unit of the reactor.

13. The method according to claim 12, further comprising:
providing the gaseous phase at the second gaseous phase temperature to an expander unit;
discharging a vent gas component of the gaseous phase from a first expander unit output,
discharging a water component of the gaseous phase from a second expander unit output.

14. The method according to claim 11, wherein an operating temperature of the reactor is greater than 374° C. and less than 600° C.

15. The method according to claim 11, the waste stream being provided to the mixing unit at a first flow rate and the waste stream being provided to the additional waste stream input at a second flow rate, the second flow rate being greater than the first flow rate.

16. The method according to claim 15, further comprising providing the waste stream to a plurality of waste stream inputs positioned downstream of the mixing unit,
wherein the waste stream is provided to each of the plurality of waste stream inputs and the additional waste stream input such that each waste stream input has a greater flow rate than any waste stream input located upstream.

17. The method according to claim 16, the plurality of waste stream inputs comprising at least two waste stream inputs;
wherein the oxidizing material does not include a water component.

18. The method according to claim 11, wherein a solids percentage of the waste stream is less than 30%.

19. A waste processing system, comprising:
a reactor, comprising:
a reactor inlet end comprising a mixing unit, the mixing unit having a reactor oxidizing material input and a first waste stream input, the reactor oxidizing material input receiving reactor oxidizing material at a temperature greater than 200° C. and at a pressure greater than 60 atm;
a reactor outlet end discharging reactor effluent; and
a plurality of additional waste stream inputs positioned between the reactor inlet end and the reactor outlet end;
a first heat exchanger in fluid communication with the reactor, the first heat exchanger comprising:
a first heat exchanger hot input receiving the reactor effluent at a first effluent temperature of greater than 200° C.;
a first heat exchanger cold input receiving a lower temperature reactor oxidizing material;
a first heat exchanger cold output providing a higher temperature reactor oxidizing material to the reactor oxidizing material input, wherein a temperature of the higher temperature reactor oxidizing material is greater than 200° C. and greater than a temperature of the lower temperature reactor oxidizing material; and
a first heat exchanger hot output discharging effluent at a second effluent temperature, the second effluent temperature being less than the first effluent temperature; and
a second heat exchanger, the second heat exchanger comprising:
a second heat exchanger hot input receiving the effluent at the second effluent temperature;
a second heat exchanger cold input receiving a gaseous phase;
a second heat exchanger cold output discharging a higher temperature gaseous phase; and
a second heat exchanger hot output discharging effluent at a third effluent temperature, the third effluent temperature being less than the second effluent temperature.

* * * * *